(12) United States Patent
Ambrosius et al.

(10) Patent No.: US 9,719,413 B2
(45) Date of Patent: Aug. 1, 2017

(54) CHARGING DEVICE FOR INTERNAL COMBUSTION ENGINES

(71) Applicant: IAV GMBH INGENIEURGESELLSCHAFT AUTO UND VERKEHR, Berlin (DE)

(72) Inventors: Volker Ambrosius, Radebeul (DE); Oliver Dingel, Chemnitz (DE); Heiko Neukirchner, Chemnitz (DE); Torsten Semper, Dresden (DE)

(73) Assignee: IAV GMBH INGENIEURGESELLSCHAFT AUTO UND VERKEHR, Berlin (DE)

( * ) Notice: Subject to any disclaimer, the term of this patent is extended or adjusted under 35 U.S.C. 154(b) by 72 days.

(21) Appl. No.: 14/434,144

(22) PCT Filed: Oct. 7, 2013

(86) PCT No.: PCT/DE2013/000579
§ 371 (c)(1),
(2) Date: Apr. 8, 2015

(87) PCT Pub. No.: WO2014/056477
PCT Pub. Date: Apr. 17, 2014

(65) Prior Publication Data
US 2015/0292398 A1    Oct. 15, 2015

(30) Foreign Application Priority Data
Oct. 8, 2012    (DE) .................. 10 2012 019 967

(51) Int. Cl.
*F02B 39/10*    (2006.01)
*F01N 5/02*    (2006.01)
(Continued)

(52) U.S. Cl.
CPC ................ *F02B 39/10* (2013.01); *F01N 5/02* (2013.01); *F02B 33/40* (2013.01); *F02B 39/02* (2013.01);
(Continued)

(58) Field of Classification Search
CPC ... Y02T 10/144; Y02T 10/6286; Y02T 10/16; Y02T 10/47; Y02T 10/26; Y02T 10/20;
(Continued)

(56) References Cited

U.S. PATENT DOCUMENTS 4,774,811 A * 10/1988 Kawamura ............. B60K 6/24
                                                     180/165
5,076,059 A * 12/1991 Okada ..................... F02B 37/10
                                                     123/198 DB
(Continued)

FOREIGN PATENT DOCUMENTS

CH         653411 A5    12/1985
DE       19960762 A1     6/2001
(Continued)

*Primary Examiner* — Stephen K Cronin
*Assistant Examiner* — Long T Tran
(74) *Attorney, Agent, or Firm* — Leydig, Voit & Mayer, Ltd.

(57) ABSTRACT

A charging device for internal combustion engines includes a compressor part configured to compress drawn-in combustion air. The compressor part is arranged in an intake line of the internal combustion engine and is connected to the internal combustion engine via an actuatable mechanical coupler. An expansion part is disposed in a circulation system for a circulating working medium. The circulation system includes at least one exhaust-gas heat exchanger and a circulation pump such that the expansion part is driven utilizing waste heat from the internal combustion engine. An electric machine is connected to the expansion part so as to drive the compressor part. The electric machine is connected to the compressor part. An operational electric connection is
(Continued)

disposed between the electric machine and a battery so that electric energy is stored during an energy-recovery mode or else so that electric energy is provided to drive the electric machine.

9 Claims, 2 Drawing Sheets

(51) Int. Cl.
*F02B 33/40* (2006.01)
*F02B 39/04* (2006.01)
*F02B 39/08* (2006.01)
*F02B 39/12* (2006.01)
*F02B 39/02* (2006.01)

(52) U.S. Cl.
CPC ............ *F02B 39/04* (2013.01); *F02B 39/085* (2013.01); *F02B 39/12* (2013.01); *Y02T 10/16* (2013.01)

(58) Field of Classification Search
CPC ...... F02D 41/0007; F02B 29/04; F02B 39/12; F02B 41/10; F02M 25/028
USPC ......... 123/568.11–568.32, 559.1–559.3, 565, 123/528
See application file for complete search history.

(56) References Cited

U.S. PATENT DOCUMENTS

| | | | |
|---|---|---|---|
| 5,105,624 A * | 4/1992 | Kawamura | F02B 37/013 60/608 |
| 5,405,624 A * | 4/1995 | Doncheck | C12C 1/047 426/11 |
| 6,450,283 B1 | 9/2002 | Taggett | |
| 6,845,738 B2 * | 1/2005 | Frutschi | F01K 21/047 123/25 C |
| 2008/0092540 A1 | 4/2008 | Ellensohn et al. | |
| 2010/0282221 A1 | 11/2010 | Le Lievre | |
| 2011/0041505 A1 | 2/2011 | Kasuya et al. | |
| 2012/0036888 A1 * | 2/2012 | Vandor | F25J 1/0022 62/613 |
| 2012/0260654 A1 | 10/2012 | Proepper | |
| 2013/0192225 A1 | 8/2013 | Rewers et al. | |
| 2013/0220116 A1 * | 8/2013 | Quix | B01D 46/0057 95/14 |
| 2013/0283790 A1 | 10/2013 | Rewers et al. | |

FOREIGN PATENT DOCUMENTS

| | | |
|---|---|---|
| DE | 10221157 A1 | 12/2003 |
| DE | 10229133 A1 | 2/2004 |
| DE | 102005058198 A1 | 6/2007 |
| DE | 102006057247 A1 | 6/2008 |
| DE | 102007026264 A1 | 12/2008 |
| DE | 102007051863 A1 | 5/2009 |
| DE | 102010025186 A1 | 4/2011 |
| DE | 102010047518 A1 | 7/2011 |
| DE | 102010025184 A1 | 12/2011 |
| DE | 102010047520 A1 | 4/2012 |
| DE | 102010049916 A1 | 5/2012 |
| DE | 102011116425 A1 | 5/2012 |
| DE | 102007026869 B4 | 7/2012 |
| EP | 0420705 A1 | 4/1991 |
| EP | 2096277 A1 | 9/2009 |
| EP | 2100022 B1 | 10/2011 |
| GB | 1539166 A1 | 1/1979 |
| GB | 2060766 A | 5/1981 |
| WO | WO 2004011790 A1 | 2/2004 |
| WO | WO 2008068060 A1 | 6/2008 |
| WO | WO 2009014488 A2 | 1/2009 |
| WO | WO 2010088980 A1 | 8/2010 |
| WO | WO 2012048958 A2 | 4/2012 |
| WO | WO 2012048959 A1 | 4/2012 |

\* cited by examiner

CHARGING DEVICE FOR INTERNAL COMBUSTION ENGINES

CROSS-REFERENCE TO PRIOR APPLICATIONS

This application is a U.S. National Stage Application under 35 U.S.C. §371 of International Application No. PCT/DE2013/000579 filed on Oct. 7, 2013, and claims benefit to German Patent Application No. DE 10 2012 019 967.8 filed on Oct. 8, 2012. The International Application was published in German on Apr. 17, 2014 as WO 2014/056477 A1 under PCT Article 21(2).

FIELD

The present invention relates to a charging device for internal combustion engines.

BACKGROUND

When it comes to enhancing the performance or improving the efficiency of internal combustion engines, charging devices are known that utilize the power loss stemming from the internal combustion engine, especially the waste heat generated by the internal combustion engine. Towards this end, the charging devices are driven by the waste heat from the exhaust gas or from the coolant. For this purpose, devices are known with which the drive of the charging devices is situated directly in the coolant circuit of the internal combustion engine or directly in the exhaust-gas line of the internal combustion engine. Other drive concepts for the charging devices make use of heat exchangers in order to dissipate the heat contained in the coolant or in the exhaust gas so that it can then be employed in a circulation process to drive the charging device.

German patent specification DE 10 2007 026 869 B4 discloses a cooling unit that is used for an internal combustion engine and that has a counterclockwise thermodynamic circulation process in which the internal combustion engine is equipped with a charging device that can be connected via actuatable mechanical couplers to the internal combustion engine as well as to an electric machine and to a coolant compressor in the vapor circuit of the circulation process. Due to the evaporation of the refrigerant in the evaporator, the device is supposed to transfer more heat from the coolant circuit of the internal combustion engine into the refrigerant circuit, whereby the coolant compressor can be driven via the charging device while utilizing the waste heat from the internal combustion engine or via the separate electric machine.

When the above-mentioned device is used, however, the heat that is transferred from the coolant circuit of the internal combustion engine to the vapor circuit can be utilized for the drive of the internal combustion engine, especially in order to drive the charging device, since no expander is provided in the vapor circuit.

European patent specification EP 2 100 022 B1 discloses a charging device for charging an internal combustion engine. The exhaust-gas line of the internal combustion engine contains an exhaust-gas heat exchanger of a closed circulation system for a circulating working medium. A expansion part of the charging device is provided in the circulation system, and this part is charged with the superheated working medium supplied by the at least one exhaust-gas heat exchanger. The superheated working medium expands via the expansion part and then drives a compressor part located in the intake line of the internal combustion engine. The expansion part of the charging device is connected directly or indirectly to an electric machine via a coupler. The electric machine can be operated as a generator. Through the actuation of the electric machine, the charging pressure in the intake line of the internal combustion engine can be regulated. When the electric machine is in the generator mode, the compressor part is driven exclusively by the expansion part. Moreover, this document describes that the expansion part is connected to the compressor part via a coupler, whereby the coupler can have a clutch. The onboard network of the motor vehicle is supplied via the expansion part and via the electric machine that is directly or indirectly coupled to it.

When the above-mentioned device is used, it is not possible to recover energy during the reverse-torque operation of the internal combustion engine, for instance, when the motor vehicle is braking or coasting. Moreover, under certain conditions, the internal combustion engine cannot be charged if, for example, the battery is at a low state of charge and only a small amount of waste heat and correspondingly little or no drive output is available at the expansion part via the circulation system. A low state of charge of the battery and a low output from the vapor circuit occur when the motor vehicle is being driven mostly at low speeds, and when, from time to time, the full output of the internal combustion engine is repeatedly needed briefly, for example, in order to overtake another vehicle. Especially in the case of small internal combustion engines with a high charging level, the charging pressure has to be built up without delay so as to ensure adequate driving comfort in the motor vehicle.

SUMMARY

In an embodiment, the present invention provides a charging device for internal combustion engines including at least one compressor part configured to compress drawn-in combustion air. The at least one compressor part is arranged in an intake line of the internal combustion engine and is connected to the internal combustion engine via an actuatable mechanical coupler. At least one expansion part is disposed in a circulation system for a circulating working medium. The circulation system includes at least one exhaust-gas heat exchanger and a circulation pump such that the at least one expansion part is driven utilizing waste heat from the internal combustion engine. An electric machine is connected to the expansion part so as to drive the compressor part. The electric machine is directly or indirectly connected to the compressor part. An operational electric connection is disposed between the electric machine and a battery so that electric energy is stored during an energy-recovery mode or else so that electric energy is provided to drive the electric machine.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
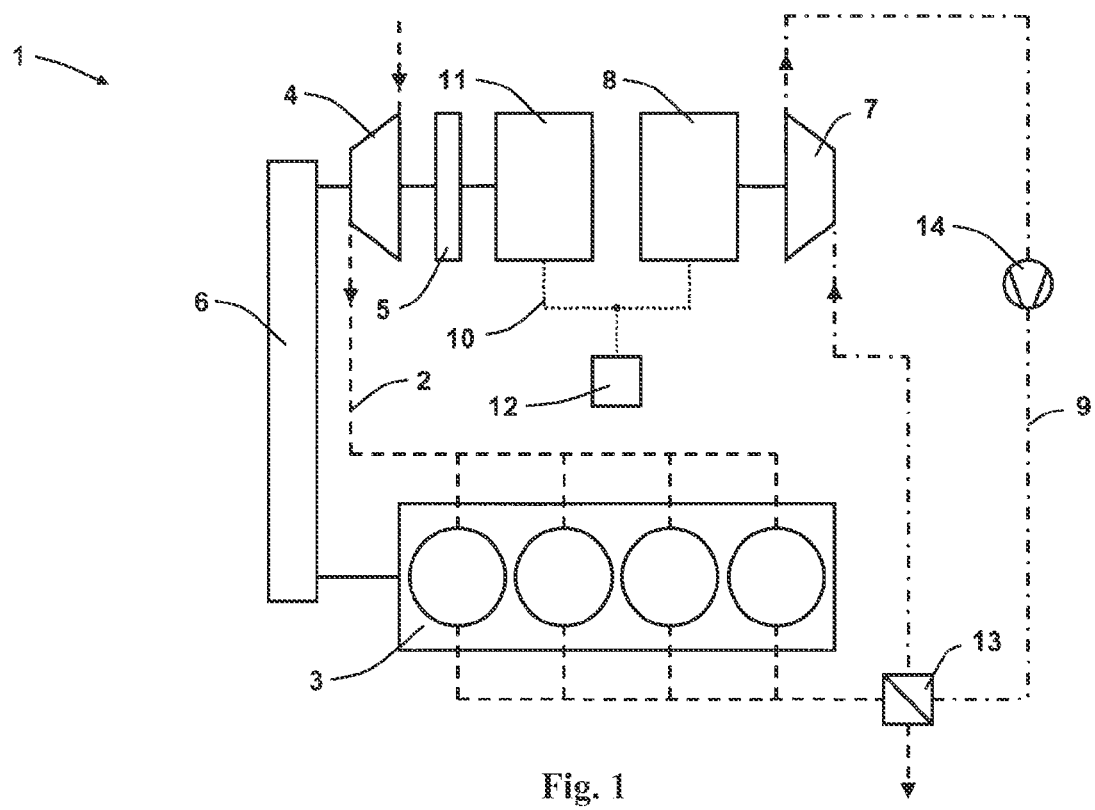
FIG. 1 shows a schematic depiction of a first embodiment of a charging device.

In an embodiment, the present invention provides an advantageous charging device for internal combustion engines by means of which energy can be recovered during the reverse-torque operation of the internal combustion engine, and the internal combustion engine can be charged when the state of charge of the battery is low and the drive output from the circulation system is low.

The charging device for internal combustion engines has at least one compressor part that serves to compress drawn-in combustion air and that is arranged in an intake line of the internal combustion engine.

Moreover, the charging device has an expansion part that is situated in a circulation system for a circulating working medium in order to drive the compressor part. Connected to the expansion part is an electric machine which serves to drive the compressor part and which can be operated as a motor or as a generator and to which the compressor part is directly or indirectly connected. Accordingly, the expansion part is directly or indirectly connected via the electric machine to the compressor part, so that the drive output provided by the expansion part can be transmitted to the compressor part. The compressor part or the expansion part of the charging device can be configured as a flow machine or as a piston machine.

The expansion part in the circulation system and the associated electric machine that serves to generate electric energy are, in turn, driven by utilizing the waste heat from the internal combustion engine. The expansion part is driven by the expansion of the circulating working medium which had been previously heated by an exhaust-gas heat exchanger situated in the exhaust-gas line of the internal combustion engine. Moreover, a circulation pump or a feed pump is provided in the circulation system.

The electric machine is connected to a battery via an operational electric connection so that electric energy can be stored during the energy-recovery mode or else so that electric energy can be provided in order to drive the electric machine.

According to an embodiment of the invention, the charging device can advantageously also be mechanically connected to the internal combustion engine. For this purpose, the charging device is provided with a mechanical coupler by means of which the charging device can be actuatably connected to the internal combustion engine. The coupler is situated in such a way that at least the compressor part can be coupled to the internal combustion engine.

The drive output can be transmitted from the expansion part to the compressor part directly via a shared shaft or indirectly via an actuatable clutch and/or via gears for the speed transmission. In this context, the electric machine can be located anywhere in the power flow between the expansion part and the compressor part. If the electric machine is mechanically connected to the compressor part, then the internal combustion engine can also be coupled to the electric machine via the compressor part.

As an alternative, the internal combustion engine can be connected via the actuatable mechanical coupler to the compressor part or to the electric machine, or else it can be connected to the compressor part and to the electric machine if the mechanical coupler is connected to the charging device between the compressor part and the electric machine.

In an advantageous manner according to the invention, the drive output is transmitted from the electric machine of the expansion part to the compressor part through the transmission of electric energy in that the compressor part is connected to another electric machine via the operational electric connection. The electric machine of the expansion part that is being operated as a generator generates electric energy that is then used to drive the additional electric machine of the compressor part. For this purpose, the electric machine is connected to the compressor part via the additional electric machine, whereby the additional electric machine is directly or indirectly connected, on the one hand, to the electric machine via the operational electric connection and, on the other hand, to the compressor part. Towards this end, the operational electric connection is configured in such a way that the electric energy that serves to drive the additional electric machine can be transmitted between the additional electric machine and the electric machine that is being operated as a generator and driven by the expansion part.

According to an embodiment of the invention, the internal combustion engine can advantageously be connected via the actuatable mechanical coupler to the compressor part or to the additional electric machine, or else it can be connected to the compressor part and to the additional electric machine if the mechanical coupler is connected to the charging device between the compressor part and the additional electric machine.

The coupling mechanism can be configured as a simple torque transmission without a gear ratio or else via a gear with a constant gear ratio between the speed of the charging device and the internal combustion engine. Accordingly, the coupling mechanism can be configured as a chain or belt drive, as a train of gears or friction gear or else as other types of gears.

According to an embodiment of the invention, the coupling mechanism can be advantageously configured as a gear with a variable gear ratio so that the speed of the charging device relative to the speed of the internal combustion engine can be varied within predefined gear-ratio limits. Accordingly, the coupling mechanism can be configured as a variable gear such as stepped gears or manual gears or else as continuously variable gears such as toroidal gears, cone ring transmissions or as variable belt and chain drives.

Moreover, the coupling mechanism can have an actuatable clutch in order to interrupt the mechanical connection between the charging device and the internal combustion engine. The actuatable clutch can be configured in such a way that several operating positions are implemented in order to implement different output paths or output branches. As a result, the compressor part or the electric machine or else both can be connected to the internal combustion engine, for instance, via the actuatable mechanical coupler.

Moreover, the coupling mechanism can have a freewheel for purposes of interrupting the mechanical connection between the charging device and the internal combustion engine whenever the load conditions change.

During the reverse-torque operation of the internal combustion engine, in other words, when the motor vehicle is braking or coasting, the mechanical coupling mechanism that serves to mechanically connect the charging device to the internal combustion engine can be used to transmit kinetic energy via the drive train to the electric machine of the charging device, to recuperate it and then to store it as electric energy in a battery on board of the motor vehicle. Owing to the mechanical coupling of the internal combustion engine to the charging device and the electric machine contained in it, energy can be recovered during certain driving states of the motor vehicle.

The operational electric connection is configured in such a way that the electric energy generated by the electric machine operated as a generator and driven by the expansion part and/or generated by the additional electric machine operated as a generator and driven by the internal combustion engine can be transmitted and stored in the battery.

Moreover, the mechanical coupler can ensure charging of the internal combustion engine, even if the drive output needed for this purpose is not available either from the battery or from the circulation system. In such cases, via the mechanical coupler, the drive output needed for the charging is provided to the charging device by the internal combustion engine, without tapping the electric energy from the battery if the latter is at a low state of charge or tapping the thermal energy from the circulation system when the waste heat utilization is low.

The operational electric connection can be configured in such a way that, between the battery and the additional electric machine, electric energy can be transmitted that serves to drive the additional electric machine and thus the compressor part when no waste heat is available to drive the expansion part and thus to generate electric energy by means of the electric machine, and when only a small amount of drive output from the internal combustion engine is available for the compressor part.

Embodiment 1

An embodiment of the device according to the invention will be presented by way of an example with reference to FIG. 1.

The charging device (1) according to an embodiment of the invention for internal combustion engines consists of a compressor part (4) which is arranged in an intake line (2) of an internal combustion engine (3) and which is connected, on the one hand, to an actuatable clutch (5) and, on the other hand, to the internal combustion engine (3) via an actuatable mechanical coupler (6). Furthermore, the charging device (1) is equipped with an expansion part (7) and with an electric machine (8) connected thereto. The electric machine (8) can be operated as a generator in that the electric machine (8) is driven by the expansion part (7). The expansion part (7) is situated in a circulation system (9) for a circulating medium that utilizes the waste heat from the internal combustion engine (3) in order to drive the expansion part (7). For purposes of utilizing the waste heat from the internal combustion engine (3), at least one exhaust-gas heat exchanger (13) and a circulation pump (14) are provided in the circulation system (9).

Via the operational electric connection (10), the electric energy that serves to drive the compressor part (4) can be transmitted between the additional electric machine (11) and the electric machine (8) that is being operated as a generator and driven by the expansion part (7).

The compressor part (4) can be connected to or disconnected from the additional electric machine (11) by means of the actuatable clutch (5). The compressor part (4) can be connected to or disconnected from the internal combustion engine (3) by means of the actuatable mechanical coupler (6). A battery (12) is likewise connected to the operational electric connection (10) so that electric energy can be stored during the energy-recovery mode or else so that electric energy can be provided to drive the additional electric machine (11).

Embodiment 2

Figure 2:
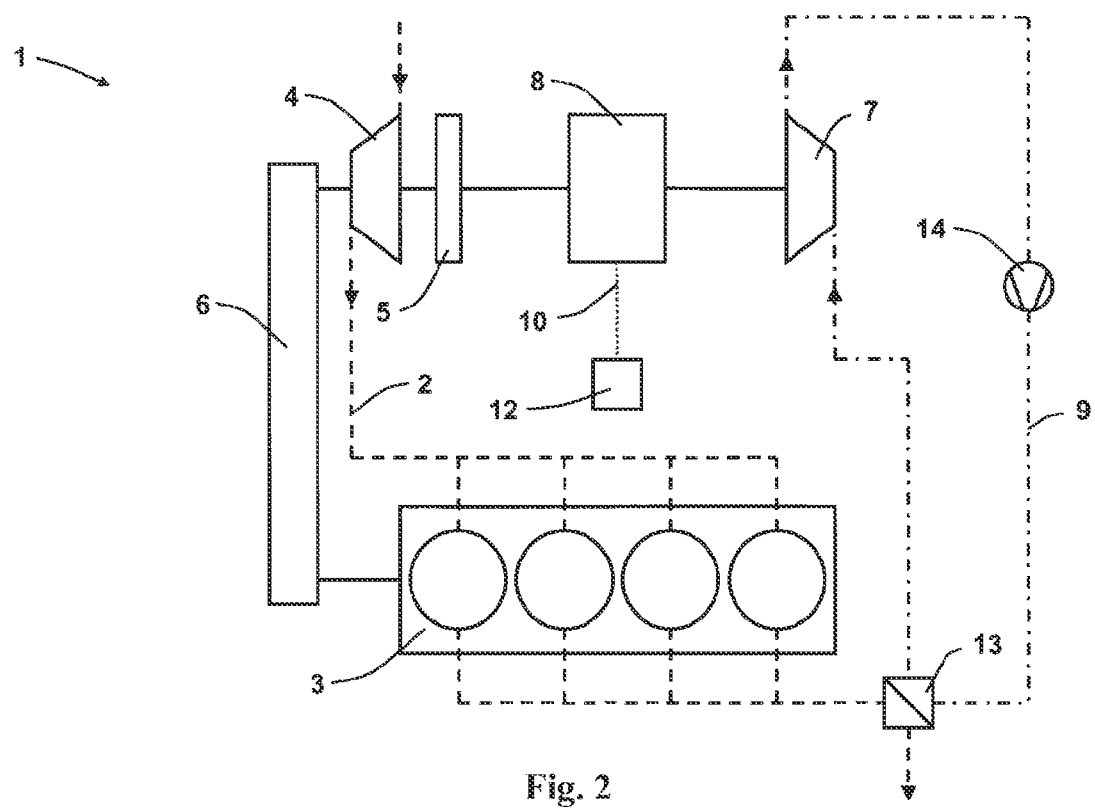
FIG. 2 shows a schematic depiction of a second embodiment of a charging device.

An embodiment of the device according to the invention will be presented by way of an example with reference to FIG. 2.

The charging device (1) according to an embodiment of the invention for internal combustion engines consists of a compressor part (4) which is arranged in an intake line (2) of an internal combustion engine (3) and which is connected, on the one hand, to an electric machine (8) via an actuatable clutch (5) and, on the other hand, to the internal combustion engine (3) via an actuatable mechanical coupler (6). The compressor part (4) can be connected to or disconnected from the electric machine (8) by means of the actuatable clutch (5). The compressor part (4) can be connected to or disconnected from the internal combustion engine (3) by means of the actuatable mechanical coupler (6). Moreover, the charging device (1) has an expansion part (7) that is connected to the electric machine (8). The expansion part (7) is situated in a circulation system (9) for a circulating medium that utilizes the waste heat from the internal combustion engine (3) in order to drive the expansion part (7). For purposes of utilizing the waste heat from the internal combustion engine (3), at least one exhaust-gas heat exchanger (13) and a circulation pump (14) are provided in the circulation system (9). A battery (12) is connected to the electric machine (8) via an operational electric connection (10) so that electric energy can be stored during the energy-recovery mode or else so that electric energy can be provided to drive the compressor part (4).

The electric machine (8) can be operated as a generator in that the electric machine (8) is driven by the expansion part (7) or by the internal combustion engine (3) that is connected via the mechanical coupler (6). Moreover, the compressor part (4) can be driven by the electric machine (8) during motor operation if no drive output is available from the utilization of waste heat. As an alternative, the compressor part (4) can be directly driven by means of the direct connection to the expansion part (7), without the electric machine (8) being operated as a generator or as a motor. For purposes of controlling the charging of the internal combustion engine (3), the electric machine (8) can be operated as a generator or as a motor at any desired working point.

Embodiment 3

Figure 3:
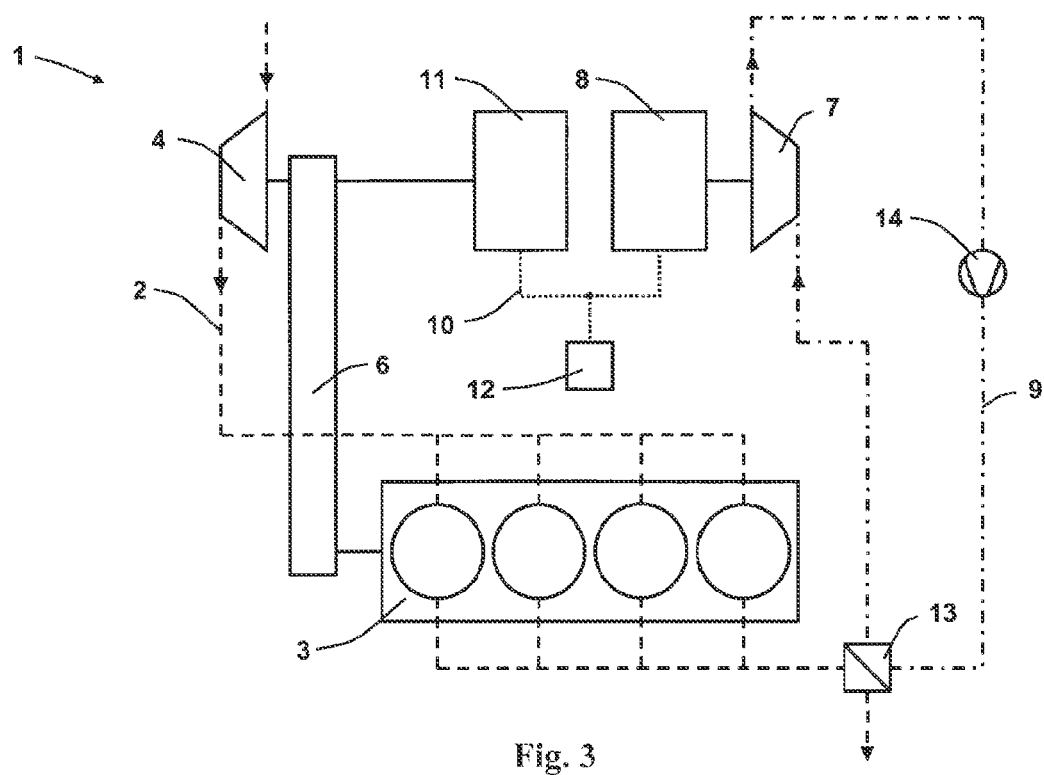
FIG. 3 shows a schematic depiction of a third embodiment of a charging device.

An embodiment of the device according to the invention will be presented by way of an example with reference to FIG. 3.

The charging device (1) according to an embodiment of the invention for internal combustion engines consists of a compressor part (4) which is arranged in an intake line (2) of an internal combustion engine (3) and which is connected to the internal combustion engine (3) via an actuatable mechanical coupler (6). Moreover, the charging device (1) is equipped with an expansion part (7) and with an electric machine (8) connected thereto. The electric machine (8) can be operated as a generator in that the electric machine (8) is driven by the expansion part (7). The expansion part (7) is situated in a circulation system (9) for a circulating medium that utilizes the waste heat from the internal combustion engine (3) in order to drive the expansion part (7). For purposes of utilizing the waste heat from the internal combustion engine (3), at least one exhaust-gas heat exchanger (13) and a circulation pump (14) are provided in the circulation system (9).

By means of an operational electric connection (10), electric energy that serves to drive the compressor part (4) can be transmitted between an additional electric machine (11) and the electric machine (8) that is being operated as a generator and driven by the expansion part (7).

The compressor part (4) can be connected to or disconnected from the additional electric machine (11) by means of the actuatable mechanical coupler (6). The compressor part (4) can be connected to or disconnected from the internal combustion engine (3) by means of the actuatable mechanical coupler (6). The additional electric machine (11) can be connected to or disconnected from the internal combustion engine via the actuatable mechanical coupler (6).

A battery (12) is likewise connected to the operational electric connection (10) so that electric energy can be stored during the energy-recovery mode or else so that electric energy can be provided to drive the additional electric machine (11).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 charging device
2 intake line
3 internal combustion engine
4 compressor part
5 actuatable clutch
6 actuatable coupler
7 expansion part
8 electric machine
9 circulation system
10 operational electric connection
11 additional electric machine
12 battery
13 exhaust-gas heat exchanger
14 circulation pump

The invention claimed is:

1. A charging device for an internal combustion engine, the device comprising:
at least one compressor part configured to compress drawn-in combustion air, the at least one compressor part being arranged in an intake line of the internal combustion engine and connected to the internal combustion engine via an actuatable mechanical coupler;
at least one expansion part disposed in a circulation system for a circulating working medium, the circulation system being separated from an exhaust-gas line of the internal combustion engine and including a circulation pump and an exhaust-gas heat exchanger, the exhaust-gas heat exchanger being configured to utilize waste heat from the exhaust-gas line of the internal combustion engine to heat the circulating working medium, the at least one expansion part being configured to be driven by an expansion of the circulating working medium which had been previously heated by the exhaust-gas heat exchanger;
an electric machine connected to the expansion part so as to drive the compressor part, the electric machine being directly or indirectly connected to the compressor part;
an operational electric connection disposed between the electric machine and a battery so that electric energy is stored during an energy-recovery mode or else so that electric energy is provided to drive the electric machine.

2. The charging device for internal combustion engines according to claim 1, wherein the electric machine is connected to the compressor part via an actuatable clutch.

3. The charging device for internal combustion engines according to claim 1, wherein the internal combustion engine is connected via the actuatable mechanical coupler to the compressor part or to the electric machine, or else is connected to the compressor part and to the electric machine.

4. The charging device for internal combustion engines according to claim 1, wherein the electric machine is connected to the compressor part via an additional electric machine, wherein the additional electric machine is directly or indirectly connected to the electric machine via the operational electric connection and to the compressor part.

5. The charging device for internal combustion engines according to claim 4, wherein the additional electric machine is connected to the compressor part via an actuatable clutch.

6. The charging device for internal combustion engines according to claim 4, wherein the internal combustion engine is connected via the mechanical coupler to the compressor part or to the additional electric machine, or else is connected to the compressor part and to the additional electric machine.

7. The charging device for internal combustion engines according to claim 4, wherein the operational electric connection is configured to transmit electric energy that serves to drive the additional electric machine between the additional electric machine and the electric machine that is configured to be operated as a generator and to be driven by the expansion part.

8. The charging device for internal combustion engines according to claim 4, characterized in that the operational electric connection is configured to transmit electric energy that serves to drive the additional electric machine between the battery and the additional electric machine.

9. The charging device for internal combustion engines according to claim 4, wherein the operational electric connection is configured to transmit electric energy to the battery for storage, the electric energy being generated by at least one of the electric machine that is configured to be operated as a generator and to be driven by the expansion part and the additional electric machine that is configured to be operated as a generator and to be driven by the internal combustion engine.

\* \* \* \* \*